(12) United States Patent
Jayachandran et al.

(10) Patent No.: US 11,494,344 B2
(45) Date of Patent: Nov. 8, 2022

(54) CUSTOMIZED ENDORSEMENT LOGIC FOR BLOCKCHAIN

(71) Applicant: International Business Machines Corporation, Armonk, NY (US)

(72) Inventors: Praveen Jayachandran, Bangalore (IN); Senthilnathan Natarajan, Bangalore (IN); Balaji Viswanathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 15/913,521

(22) Filed: Mar. 6, 2018

(65) Prior Publication Data

US 2019/0278852 A1    Sep. 12, 2019

(51) Int. Cl.
G06F 16/00 (2019.01)
G06F 16/182 (2019.01)
H04L 9/06 (2006.01)

(52) U.S. Cl.
CPC .......... G06F 16/182 (2019.01); H04L 9/0643 (2013.01)

(58) Field of Classification Search
CPC .................................................... G06F 16/182
USPC .......................................................... 707/758
See application file for complete search history.

(56) References Cited

U.S. PATENT DOCUMENTS

| | | |
|---|---|---|
| 9,849,364 B2 | 12/2017 | Tran et al. |
| 2015/0170112 A1 | 6/2015 | DeCastro |
| 2016/0330034 A1 | 11/2016 | Back et al. |
| 2017/0352027 A1 | 12/2017 | Zhang et al. |
| 2017/0372300 A1 | 12/2017 | Dunlevy et al. |
| 2018/0005186 A1 | 1/2018 | Hunn |
| 2018/0018723 A1 | 1/2018 | Nagla et al. |
| 2018/0158034 A1* | 6/2018 | Hunt .................... G06Q 20/027 |
| 2018/0365688 A1* | 12/2018 | He ........................ G06Q 20/401 |
| 2019/0043043 A1* | 2/2019 | Saraniecki ............ H04L 9/0637 |
| 2019/0188706 A1* | 6/2019 | McCurtis ............... G06Q 20/40 |

FOREIGN PATENT DOCUMENTS

WO    2017122187 A3    9/2017

OTHER PUBLICATIONS

List of IBM Patents or Patent Applications Treated as Related, May 17, 2018.

(Continued)

*Primary Examiner* — Chelcie L Daye

(57) ABSTRACT

An example operation may include one or more of receiving, via a network, a blockchain request from a client device, simulating a transaction of the blockchain request to generate a read set of data being read by the transaction and a write set of data being written by the transaction, determining whether to endorse the transaction with respect to a distributed ledger by executing customizable endorsement logic of the blockchain node, wherein the executing customizable endorsement logic receives, as input, the generated read and write sets and determines whether or not the transaction should be committed to a data block of the distributed ledger based on the generated read and write sets, and transmitting information about a result of the customized endorsement logic determination to the client device.

20 Claims, 11 Drawing Sheets

(56) References Cited

OTHER PUBLICATIONS

Seep Goel, Prioritization in a Permissioned Blockchain, U.S. Appl. No. 15/980,432, filed May 15, 2018 (a copy is not provided as this application is available to the Examiner).
Amsee, "Raiden: The Off Chain Scaling Service." Amsee, Ethereum Raiden Network Oct. 6, 2017, https://www.crypto-news.net/raiden-ico-a-public-coin-for-the-off-chain-scaling-service/.
Block Digest, "Hyperledger Fabric." http://blockdigest.com/hyperledger-fabric/.
Ethereum Stack Exchange, "How do oracle services work under the hood?" Asked Jan. 23, 2017 at 7:53 by Artem.Answered Jan. 23, 2017 at 8:48 by Edmund Edgar. https://ethereum.stackexchange.com/questions/11589/how-do-oracle-services-work-under-thehood.
Hyperledger-Fabricdocs, "The Hyperledger Fabric, Architecture Explained." Hyperledger 2017 Revision 70a7ce5b, http://hyperledger-fabric.readthedocs.io/en/release/arch-deep-dive.html.
J. Mahony, "The UbiquiCoin Consensus Protocol: Proof of Majority, A Democratic Model for Decentralized Network Consensus." Draft 1.0—Nov. 12, 2017.
T. Bertani, "Understanding oracles." Feb. 18, 2016, https://blog.oraclize.it/understanding-oracles-99055c9c9f7b.
Trinity White Paper, "An Off-chain Scaling Solution for Neo."
Z. Ren et al.,"A Scale-out Blockchain for Value Transfer with Spontaneous Sharding." Delft University of Technology, Mekelweg 5, 2628CD, Delft, the Netherlands, Jan. 8, 2018.
Zap Whitepaper, "Connecting smart contracts to the off-chain world.", Whitepaper v2.1 Oct. 10, 2017.

\* cited by examiner

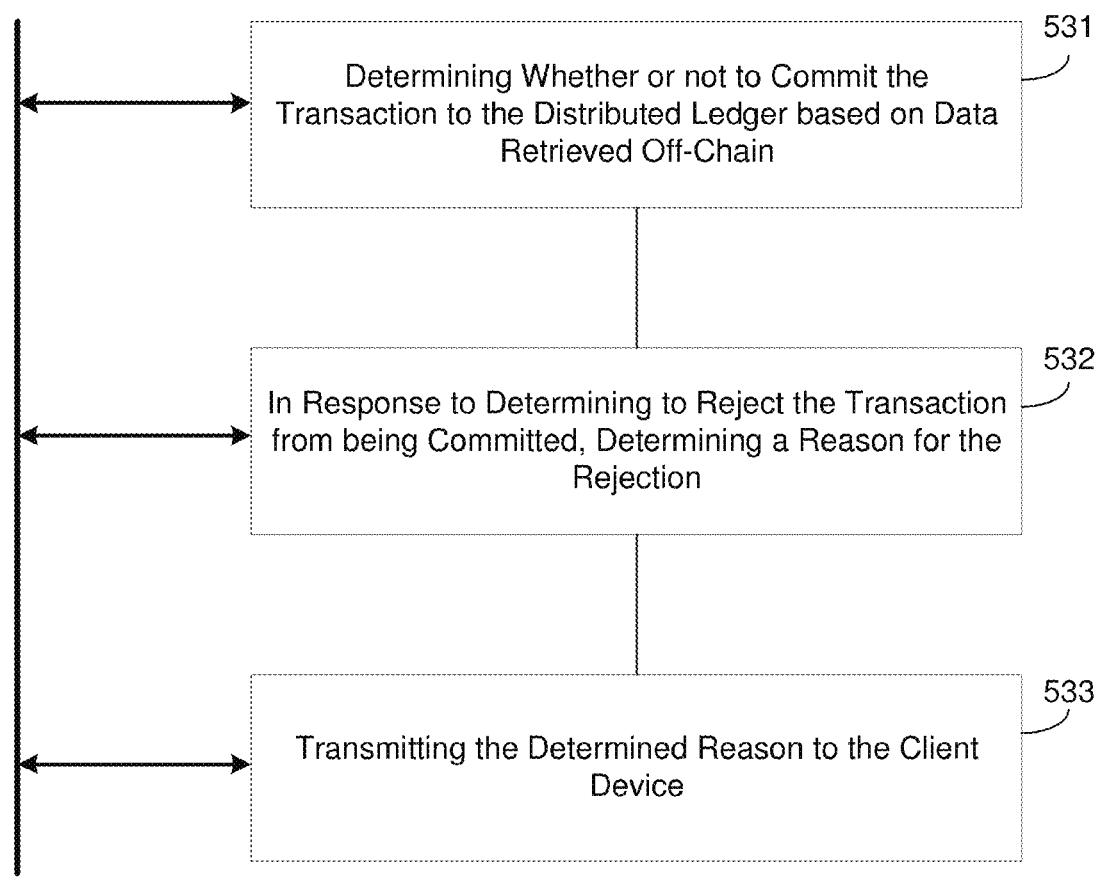

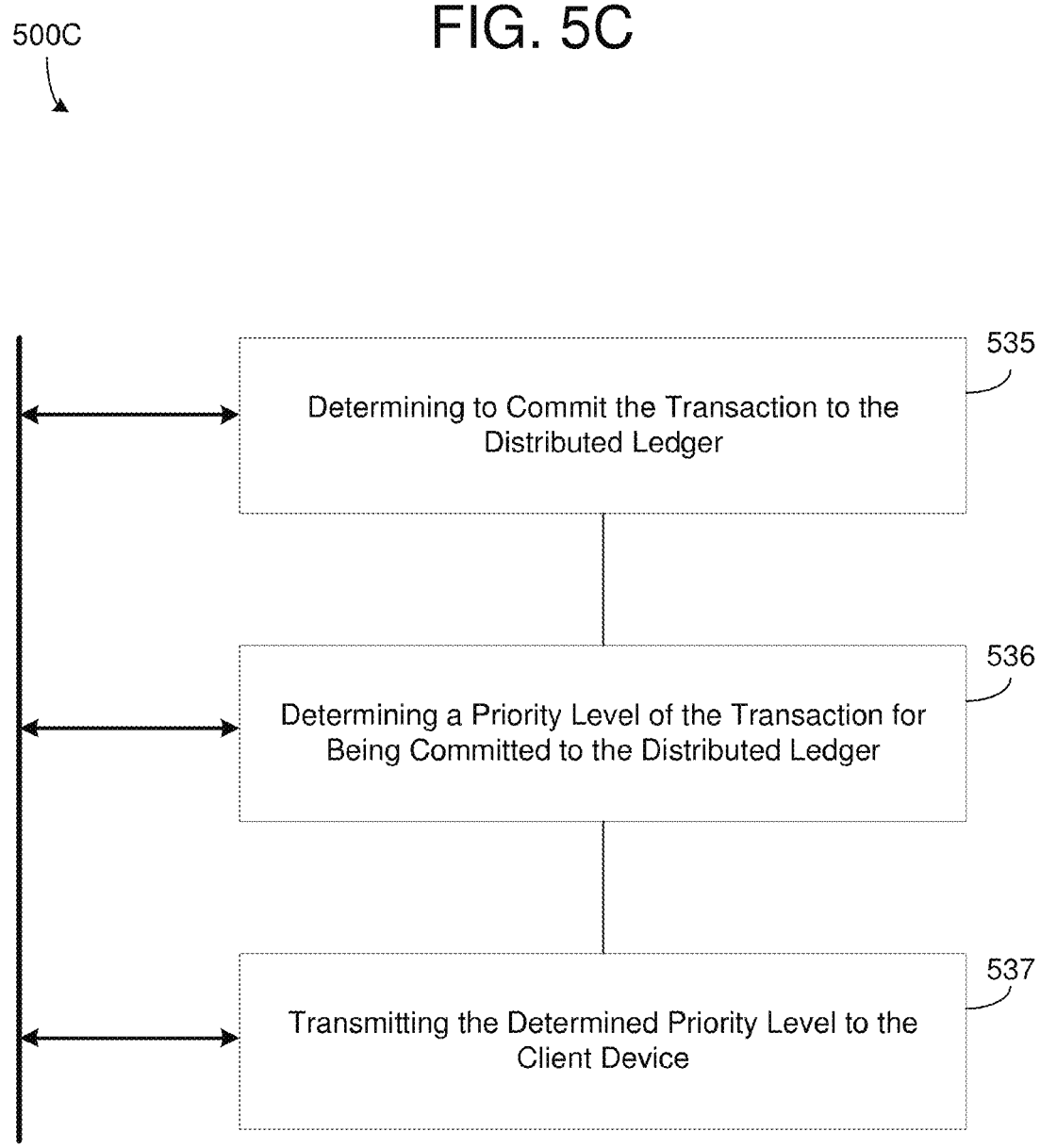

600A

CUSTOMIZED ENDORSEMENT LOGIC FOR BLOCKCHAIN

TECHNICAL FIELD

This application generally relates to a distributed ledger such as a blockchain network system, and more particularly, to a blockchain node of a blockchain network which can implement customized endorsement logic when determining whether a transaction is valid and can be committed to the immutable ledger of the blockchain network.

BACKGROUND

A distributed ledger is a continuously growing list of records that typically apply cryptographic techniques such as storing cryptographic hashes relating to other blocks. A blockchain is one common instance of a distributed ledger. Although, often used for financial transactions, a blockchain can store various other types of information such as information related to goods and services (i.e., products, packages, status, etc.). A decentralized scheme provides authority and trust to a decentralized network of nodes and enables the nodes to continuously and sequentially record their transactions on a public "block", creating a unique "chain" referred to as the distributed ledger. Cryptography, such as via hash codes, may be used to secure an authentication of a transaction source and remove a central intermediary. The records stored on the distributed ledger can be secured from tampering and revision due to their immutable properties. Each block may include a timestamp and a link to a previous block. The distributed ledger can be used to hold, track, transfer and verify information. Since the ledger is a distributed system, before adding a transaction to the distributed ledger, peers need to reach a consensus status.

When a client node desires to invoke a transaction that is to be committed to the distributed ledger (blockchain), the client node submits the transaction to one or more endorsing nodes which have authority to endorse the transaction. When receiving the request from the client node, the endorsing node simulates the transaction by invoking the smart contract to which the transaction refers and a copy of a state held by the endorsing peer. The endorsing node then has endorsing logic which endorses the transaction. By default, the endorsing logic at the node accepts the transaction and simply signs the transaction. However, the endorsing logic does not enable the node to decide whether the transaction should be allowed or whether the transaction should be rejected, nor does the endorsement logic enable the node to determine whether to endorse the transaction based on off-chain information that may be relevant to the transaction such as information acquired from an external data source, another blockchain, a user input, system resources, and the like.

SUMMARY

One example embodiment may provide a blockchain node system that includes at least one of a network interface configured to receive a blockchain request from a client device, and a processor configured to simulate a transaction of the blockchain request to generate a read set of data being read by the transaction and a write set of data being written by the transaction, and determine whether to endorse the transaction with respect to a distributed ledger via execution of customizable endorsement logic of the blockchain node, wherein the executing customizable endorsement logic receives, as input, the generated read and write sets and determines whether or not the transaction should be committed to a data block of the distributed ledger based on the generated read and write sets, and the processor is further configured to control the network interface to transmit information about a result of the customized endorsement logic determination to the client device.

Another example embodiment may provide a method that includes at least one of receiving, via a network, a blockchain request from a client device, simulating a transaction of the blockchain request to generate a read set of data being read by the transaction and a write set of data being written by the transaction, determining whether to endorse the transaction with respect to a distributed ledger by executing customizable endorsement logic of the blockchain node, wherein the executing customizable endorsement logic receives, as input, the generated read and write sets and determines whether or not the transaction should be committed to a data block of the distributed ledger based on the generated read and write sets, and transmitting information about a result of the customized endorsement logic determination to the client device.

A further example embodiment may provide a non-transitory computer readable medium comprising instructions, that when read by a processor, cause the processor to perform a method including at least one of receiving, via a network, a blockchain request from a client device, simulating a transaction of the blockchain request to generate a read set of data being read by the transaction and a write set of data being written by the transaction, determining whether to endorse the transaction with respect to a distributed ledger by executing customizable endorsement logic of the blockchain node, wherein the executing customizable endorsement logic receives, as input, the generated read and write sets and determines whether or not the transaction should be committed to a data block of the distributed ledger based on the generated read and write sets, and transmitting information about a result of the customized endorsement logic determination to the client device.

BRIEF DESCRIPTION OF THE DRAWINGS

FIG. 5A-5C are diagrams illustrating methods for processing a blockchain transaction based on a customized endorsement logic, according to example embodiments.

DETAILED DESCRIPTION

Figure 1:
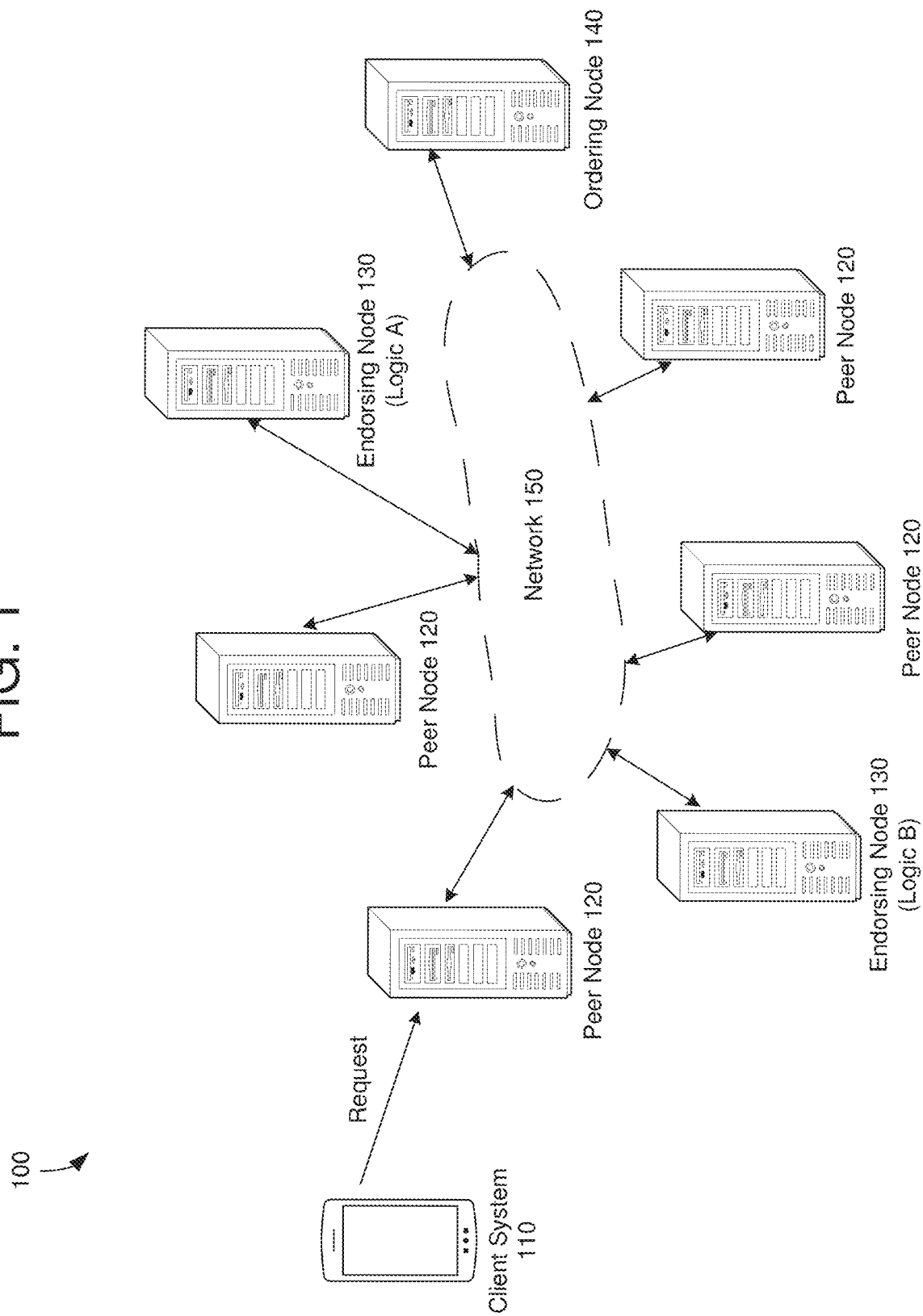
FIG. 1 is a diagram illustrating a blockchain network for customized endorsement processing, according to example embodiments.

It will be readily understood that the instant components, as generally described and illustrated in the figures herein, may be arranged and designed in a wide variety of different configurations. Thus, the detailed description of the embodiments of at least one of a method, an apparatus, a non-transitory computer readable medium and a system, as represented in the associated figures and description, is not intended to limit the scope of the application, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of messages or network data, such as, packet, frame, datagram, etc. Furthermore, while certain types of messages, signaling and protocols may be depicted in exemplary embodiments they are not limited to a certain type of message, signaling or protocol.

In a conventional blockchain endorsement smart contract, an endorsing node simulates or otherwise executes the transaction and signs the transaction's read and write set using the endorsing node's private key without performing any other checks on the data. This simple logic is applied on all endorsing nodes on the blockchain just to ensure that all endorsing nodes arrive at the same transaction output, or in other words, the transaction's read and write sets are identical on all nodes. A conventional endorsing node always endorses the simulated transaction with the output that it computed.

Example embodiments provide methods, devices, networks and/or systems, which improve upon the conventional endorsement logic by supporting specialized (or customized) endorsement logic which may be executed by an endorsing node within a blockchain network to determine whether to endorse a transaction or whether to decline endorsing the transaction. The specialized endorsement logic may be added to the endorsing node by an administrator or other authoritative entity of the blockchain network. For example, the specialized/customized endorsement logic may be included within code of a smart contract written in any desired programming language such as Golang, Solidity, C#, Python, etc. In some cases, the specialized endorsement logic may differ from node-to-node within a same blockchain network that endorses the same transactions. The specialized endorsement logic may be implemented within a smart contract that is installed and executed via the endorsing node. Furthermore, the data accessed by the specialized endorsement logic may reside outside of the blockchain (i.e., off-chain) such as a local data source on the endorsing node system, an external data source, a user input, and the like.

A blockchain network is a distributed system consisting of multiple nodes that communicate with each other via a communication network. A blockchain node runs programs called chaincode (e.g., smart contracts, etc.), holds state and ledger data, and executes transactions. Transactions are operations invoked on the chaincode. Transactions typically must be "endorsed" and only endorsed transactions may be committed and have an effect on the state of the blockchain. There may exist one or more chaincodes for management functions and parameters, collectively called system chaincodes. A traditional endorsement process involves a node simulating and signing a transaction without making any determinations regarding the content of the transaction. However, such a process fails to add benefit to the endorsement process from outside sources. According to various aspects, the specialized endorsement logic described herein can be customized for a specific node and can consider factors such as content of the transaction, external data sources, timing, system resources, user input, and many other factors that are off-chain from the transaction.

Nodes are the communication entities of the blockchain system. A "node" is a logical function in the sense that multiple nodes of different types can run on the same physical server. Nodes may be grouped in trust domains and associated to logical entities that control them in various ways. Nodes may include different types such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain the state and a copy of the ledger. In many cases, nodes can serve multiple roles within the blockchain network. For example, a peer node can also have the role of an endorser node, a client node, and the like, although it is not a requirement. An ordering-service-node or ordering node is a node running the communication service for all nodes and which implements a delivery guarantee, such as atomic or total order broadcast to each of the peer nodes in the system when committing transactions and modifying the world state.

A distributed ledger (also referred to herein as an immutable ledger) is a sequenced, tamper-resistant record of all state transitions of a network of nodes. State transitions are a result of chaincode invocations (i.e., transactions) submitted by participating parties (e.g., client nodes, ordering nodes, endorser nodes, peer nodes, etc.) A transaction may result in a set of asset key-value pairs that are committed to the ledger as creates, updates, deletes, and the like. The ledger may include a blockchain (also referred to as a chain) and may store an immutable, sequenced record in blocks. The ledger may also include a state database which maintains a current state of the blockchain. There is typically one ledger per channel. Each peer node maintains a copy of the ledger for each channel of which they are a member. Accordingly, a node may store multiple ledgers when they participate in multiple channels.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links.

A hash of a most recently added block represents every transaction on the chain that has come before it, making it possible to ensure that all peer nodes are in a consistent and trusted state. The chain may be stored on the peer node file system (local, attached storage, cloud, etc.), efficiently supporting the append-only nature of the blockchain workload.

The current state of the immutable distributed ledger represents the latest values for all keys that are included in the chain transaction log. Because the current state represents the latest key values known to the channel, it is sometimes referred to as a world state. Chaincode invocations execute transactions against the current state data of the ledger. To make these chaincode interactions efficient, the latest values of the keys may be stored in the state database. The state database may be simply an indexed view into the chain's transaction log, it can therefore be regenerated from the chain at any time. The state database may automatically get recovered (or generated if needed) upon peer node startup, and before transactions are accepted.

Conventional blockchain endorsement logic is simplistic and limiting. A typical endorsement process merely includes a simulation of an underlying transaction and a signature by the endorsing node. This process is common across all endorsing nodes. However, the conventional endorsement logic does not have the ability to reject endorsement of a transaction. In other words, traditional endorsement logic does not give the endorsing node the power to decline an endorsement nor provide a reason for declining the endorse. Also, conventional blockchain endorsement logic is bound to access only the data included within a blockchain.

The example embodiments provide significant benefits over the conventional blockchain endorsement logic. For example, the specialized endorsement logic described herein may be customized to access off-chain external, private information that is available to the peer such as a system clock, another blockchain or ledger, an application (e.g., analytic, etc.), a user input via a user interface, an external data source, priority information, and the like. In addition, the specialized endorsement logic can determine a negative response to an endorsement request, for example, when the logic determines that a node/client is not allowed to access the blockchain the logic may issue a rejection along with a reason for the rejection.

In some embodiments, the specialized endorsement logic can provide a priority level to a transaction that is endorsed to provide a level of priority with respect to all transactions that are endorsed when they are being committed to the blockchain. Also, the priority may be aggregated from a plurality of endorsing nodes to determine a group priority (e.g., a vote) as to the priority of a transaction. By expanding what can be considered by endorsement logic, additional information available outside of a blockchain may be used to make determinations for transactions being recorded on the blockchain.

FIG. 1 illustrates a blockchain network 100 for customized endorsement processing, according to example embodiments. Referring to FIG. 1, the blockchain network 100 includes a plurality of nodes that are attempting to commit a transaction from a client device 110. In this example, the nodes are designated as peer nodes 120, endorsing nodes 130, and an ordering node 140. However, it should be appreciated that some of the nodes may have more than one role, and different numbers and types of nodes may be present within the network 100. In operation, client node 110 submits a transaction request to a peer node 120 which then forwards the transaction request to a first endorsing node 130A and a second endorsing node 130B based on an endorsement policy of the transaction received from the client 110.

In the example of FIG. 1, the first endorsing node 130A has its own customized endorsement logic A while the second endorsing node 130B also has its own customized endorsement logic B. Here, the customized endorsement logic A and the customized endorsement logic B may be different. For example, the logic may include different ratios, different requirements, different variables, different priorities, different timings, different conditions, and the like. As one non-limiting example, endorsement logic A may require a perfect match between an attribute value requested in the transaction and the attribute value stored on the blockchain while endorsement logic B may not require a perfect match between attributes but may instead perform a resolving when there is not a perfect match between the attribute in the request and the corresponding attribute stored on the blockchain.

In response to receiving the transaction from the client system 110 via the peer node 120, the endorsing nodes 130A and 130B simulate the transaction to generate read and write sets for the transaction. Furthermore, the endorsing node 130A inputs the read and write sets into its own customized endorsement logic A to determine whether or not to endorse the transaction, and endorsing node 130B inputs the read and write sets into its own customized endorsement logic B to determine whether or not to endorse the transaction. Because the endorsing node 130A and 130B are using different endorsement logic, it is possible that one endorsing node may approve endorsement of the transaction while the other may reject endorsement of the transaction.

After determining whether to endorse or to decline the transaction, the endorsing nodes 130A and 130B transmit information about the respective customized endorsement determinations to one or more nodes in the network 100. For example, the endorsing nodes 130A and 130B may transmit a determination of the endorsement to the client system 110 via the peer node 120. Here, if the client system 110 receives enough positive endorsements, the client 110 may request that the transaction be sent to ordering node 140 where it can be added to a block and broadcast to other nodes (e.g., peer nodes 120 and/or ordering nodes 130) in the network 100 for committal to a distributed ledger that is replicated between the nodes.

Figure 2A:
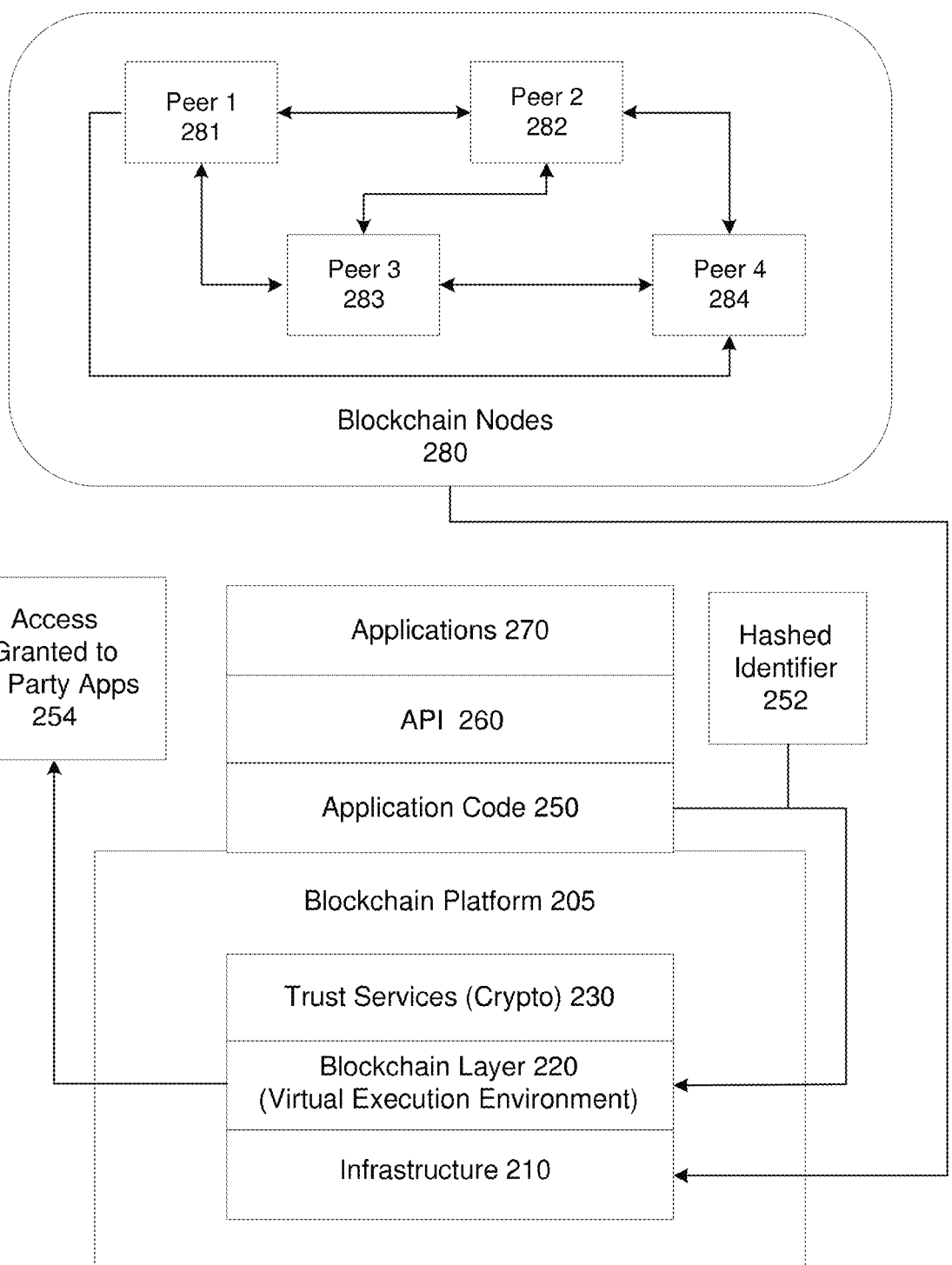
FIG. 2A is a diagram illustrating a peer node blockchain architecture configuration for an asset sharing scenario, according to example embodiments.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). One or more of the blockchain nodes 281-284 may endorse transactions and one or more blockchain nodes 281-281 may provide an ordering service for all blockchain nodes in the architecture 200A. A blockchain node may initiate a blockchain authentication and seek to write to a distributed immutable ledger stored in blockchain layer 220, a copy of which may also be stored on the underpinning physical infrastructure 210. The blockchain configuration may include one or applications 270 which are linked to application programming interfaces (APIs) 260 to access and execute stored program/application code 250 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 281-284.

The blockchain base or platform 205 may include various layers of blockchain data, services (e.g., cryptographic trust services, virtual execution environment, etc.), and underpinning physical computer infrastructure that may be used to receive and store new transactions and provide access to auditors which are seeking to access data records stored in the ledger. The blockchain layer 220 may expose an interface that provides access to the virtual execution environment necessary to process the program code and engage the physical infrastructure 210. Cryptographic trust services 230 may be used to verify transactions such as asset exchange transactions and keep information private.

The blockchain system architecture configuration 200A of FIG. 2A may process and execute program/application code 250 via one or more interfaces exposed, and services provided, by blockchain platform 205. The code 250 may control blockchain assets. For example, the code 250 can store and transfer data blocks, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. According to various embodiments, smart contracts may also be used to execute customized endorsement logic which determines whether to endorse a transaction based on off-chain data. The smart contracts can themselves be used to identify rules associated with authorization and access requirements and usage of the ledger. For example, hashed identifier information 252 received from a client device may be processed by one or more processing entities (e.g., virtual machines) included in the blockchain layer 220. The result may include access being granted 254 to a third-party application from the blockchain computing environment. In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, and then written to a block in the blockchain. The smart contract may include executable code which is registered, stored, and/or replicated with a blockchain (e.g., distributed network of blockchain peers). However, in some embodiments, a smart contract including customized endorsement logic may be unique to a node with respect to other nodes in a common blockchain network. A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In this example of FIG. 2A, the release and acquire smart contract information may be updated 222 according to the specifications of the entities providing asset services. One function may be to provide the requesting entity, in this example entity #2 with access 224 to the asset if the entity #2 has the correct credentials and the expiration date has not yet matured and is still in an active or pending status (i.e., before the expiration date). The correct credentials are required and the smart contracts conditions must be satisfied prior to releasing the asset access information.

Figure 2B:
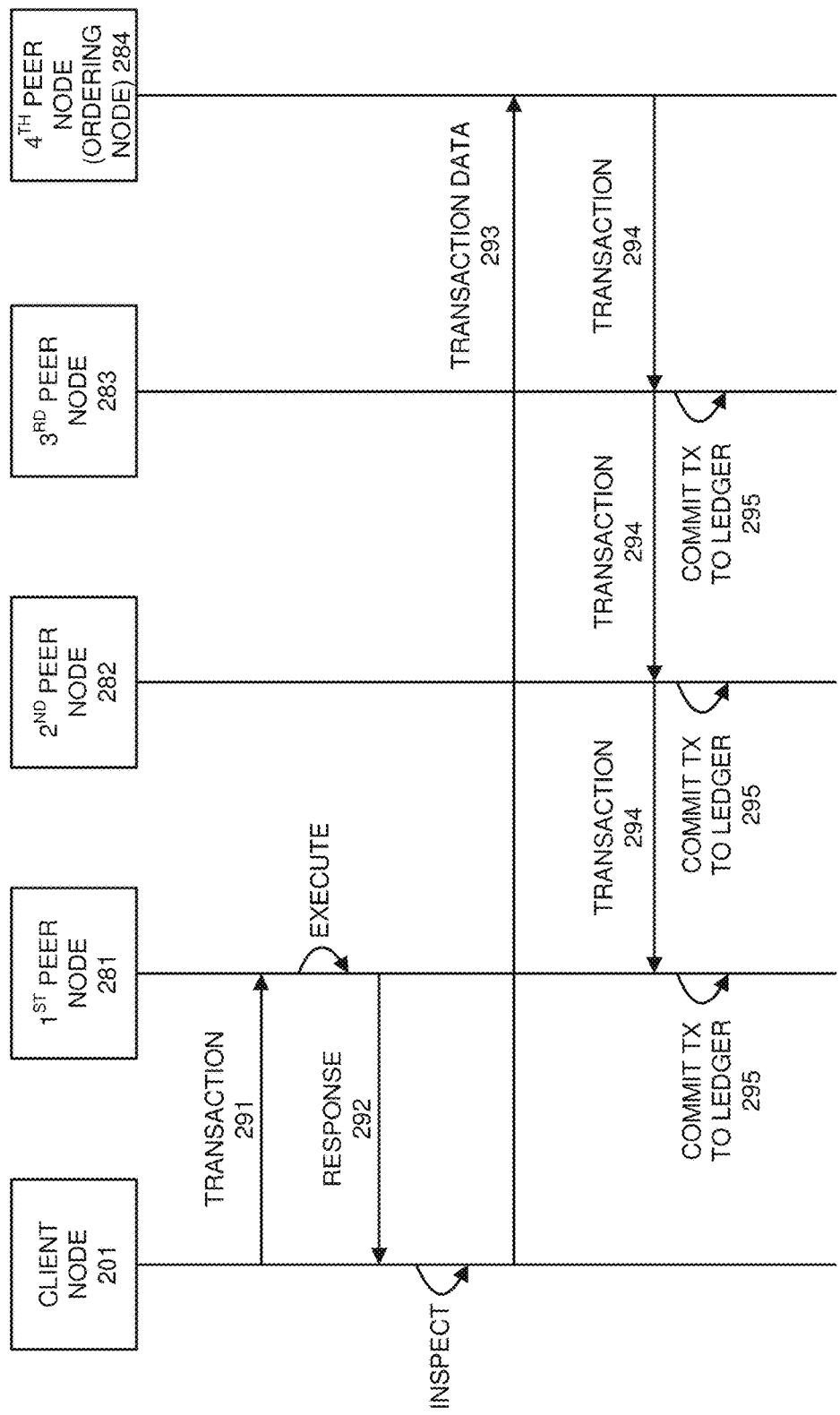
FIG. 2B is a diagram illustrating a peer node blockchain configuration, according to example embodiments.

FIG. 2B illustrates an example of a transactional flow 200B between nodes of the blockchain in accordance with an example embodiment. Referring to FIG. 2B, the transaction flow 200B may include a transaction proposal sent by an application client node 201 to an endorsing peer node 281. The endorsing peer 281 may verify the client signature, and execute a chaincode function to simulate the transaction. Furthermore, according to various embodiments, the endorsing peer 281 may execute customized endorsement logic based on off-chain data such as system information, user input, other blockchain information, external data sources, and the like, to determine whether or not to endorse the transaction. The output is the chaincode results, a set of key/value versions that were read in the chaincode (read set), and the set of keys/values that were written in chaincode (write set). When the endorsing peer 281 determines to endorse the transaction, the proposal response gets sent back to the client 201 along with an endorsement signature. The client assembles the endorsements into a transaction payload and broadcasts it to an ordering service node 284. The ordering service node 284 then delivers ordered transactions as blocks to all peers 281-283 on a channel. Before committal, each peer 281-283 may validate the transactions. For example, they may check the endorsement policy to ensure that the correct allotment of the specified peers have signed the results, and authenticate the signatures against the transaction payload.

Referring to FIG. 2B, in step 291 the client node 201 initiates the transaction by constructing and sending a request to the peer node 281 which is an endorser. The client 201 may include an application leveraging a supported software development kit (SDK) such as Node, Java, Python, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over gRPC) and take the client's cryptographic credentials to produce a unique signature for this transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In addition, the chaincode may also include specialized endorsement logic which can be used to determine whether to deny the transaction, approve/endorse the transaction, a level of priority of the transaction, and the like. In step 292, the set of these values, along with the determination by the endorsing peer node 281 and the endorsing peer node's 281 signature is passed back as a proposal response to the SDK of the client 201 which parses the payload for the application to consume.

In response, the application of the client 201 inspects/verifies the customized endorsing determinations made by the endorsing peers (including signatures) and compares the proposal responses to determine if the proposal response is the same. If the chaincode only queried the ledger, the application would inspect the query response and would typically not submit the transaction to the ordering service 284. If the client application intends to submit the transaction to ordering service 284 to update the ledger, the application determines if the specified endorsement policy has been fulfilled before submitting (e.g., did peer nodes necessary for the transaction both endorse based on customized endorsement logic, etc.) Here, the client may include only one of multiple parties to the transaction. In this case, each client may have their own endorsing node, and each endorsing node will need to endorse the transaction. The architecture is such that even if an application chooses not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation; it may simply receive transactions from all channels in the network, order them chronologically by channel, and create blocks of transactions per channel.

In step 294, the blocks of the transaction are delivered from the ordering node 284 to all peer nodes 281-283 on the channel. The transactions within the block are validated to ensure endorsement policy is fulfilled and to ensure that there have been no changes to ledger state for read set variables since the read set was generated by the transaction execution. Transactions in the block are tagged as being valid or invalid. In some embodiments, the transactions may be ordered based on priority which is decided from the endorsing peers. For example, each endorsing peer may vote on a priority of each transaction to be committed to the ledger. The ordering node can identify an aggregate vote for each transaction and order transactions from highest priority to lowest priority, etc. Furthermore, in step 295 each peer node 281-283 appends the block to the channel's chain (or other distributed ledger), and for each valid transaction the write sets are committed to current state database. An event is emitted, to notify the client application that the transaction (invocation) has been immutably appended to the chain, as well as notification of whether the transaction was validated or invalidated.

Figure 3:
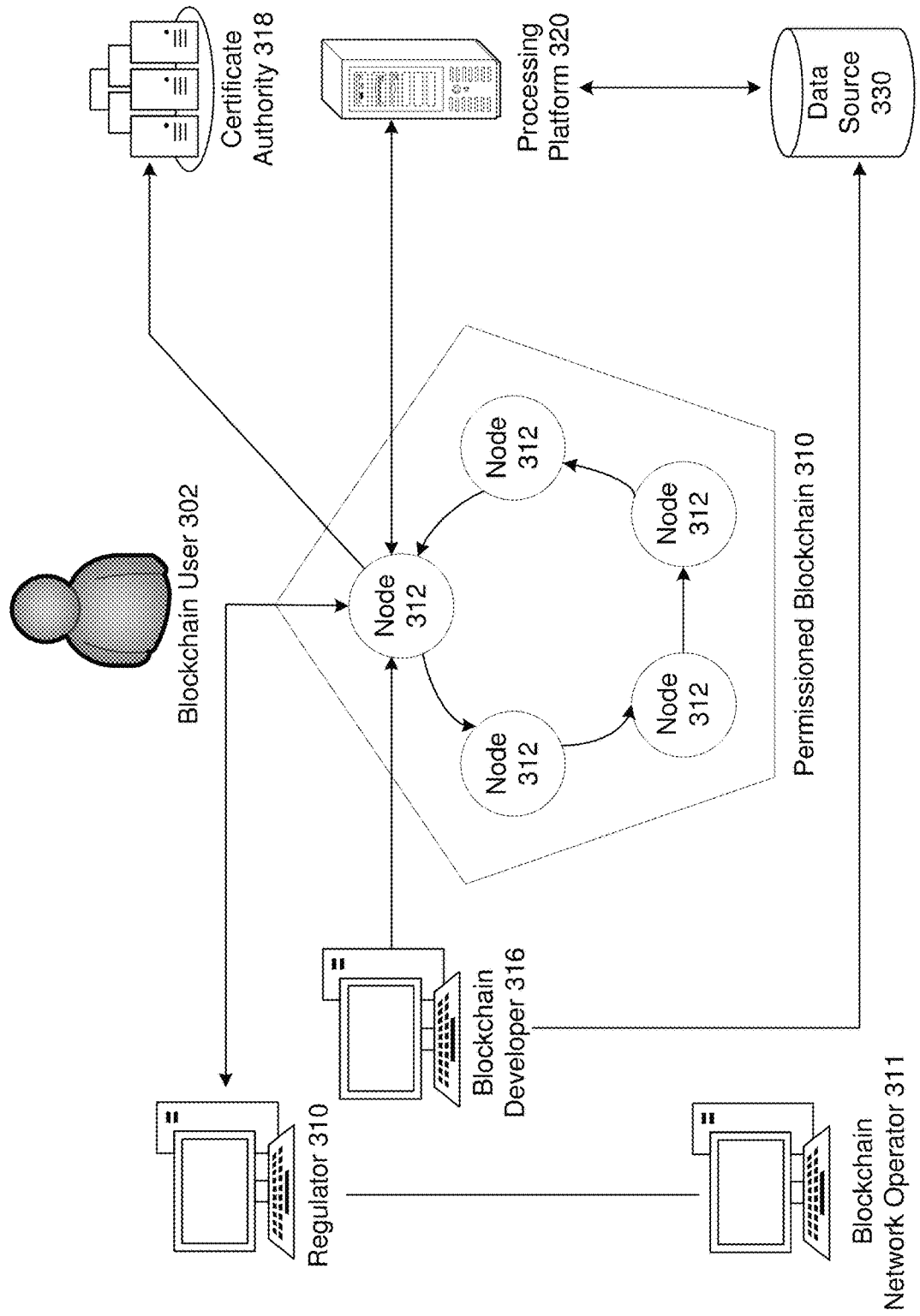
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. The transaction can be a deploy, invoke or query, and may be issued through a client-side application leveraging an SDK, directly through a REST API, or the like. Trusted business networks may provide access to regulator systems 310 such as auditors (the Securities and Exchange Commission in a U.S. equities market, for example). Meanwhile, a blockchain network operator system 311 manages member permissions such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

In the permissioned blockchain network 300, the participant nodes 312 are known and have verifiable identity within the network. This identity of a peer node 312 allows for each peer node 312 to 'endorse' the transaction and record its result with its unique signature. The unique signature is then verifiable by any other party/node on the network allowing for enforcement of endorsement policies. In a permission-less blockchain. The permissioned blockchain network 300 may allow only an admin of the nodes such as blockchain network operator 311 to deploy the specialized endorsement logic. Hence, not any user can upload the logic. First, the logic may be verified by the admin node before deploying into another peer node 312. Peer nodes 312 in the permissioned blockchain network 300 may not have different permissions. However, each peer node 312 may have its own specialized endorsement logic (e.g., smart contract) which runs on the peer 312 during appropriate phase in transaction lifecycle.

Figure 4:
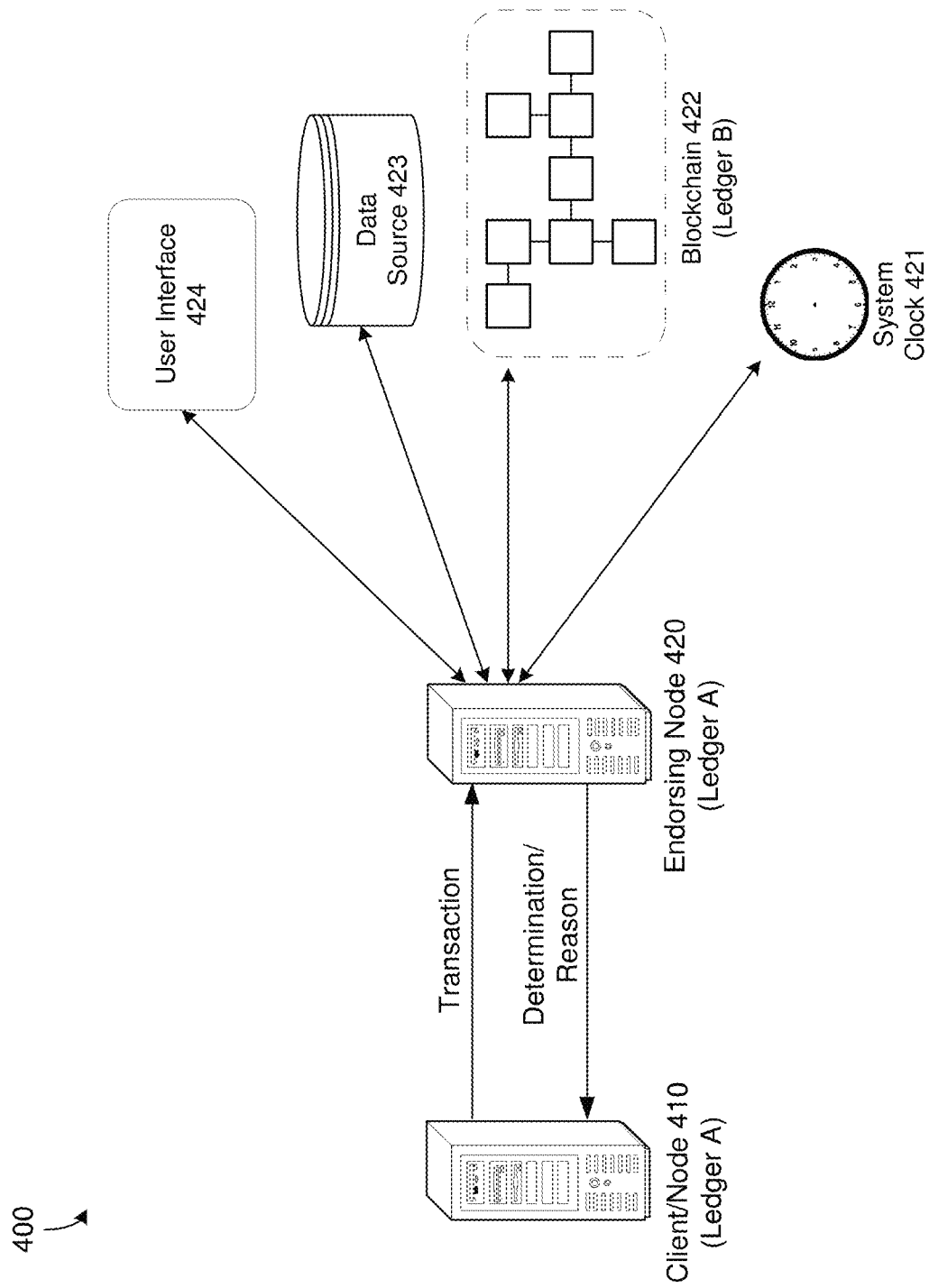
FIG. 4 is a diagram illustrating a blockchain node performing a customized endorsement process, according to example embodiments.

FIG. 4 illustrates a blockchain node 420 performing a customized endorsement process, according to example embodiments. Referring to FIG. 4, the endorsing node 420 receives a request from a client node 410 for committing a transaction a distributed ledger A such as a blockchain. In this example, the endorsing node 420 executes customized endorsement logic to determine whether or not to endorse the transaction for inclusion in the distributed ledger A. The customized endorsement logic may access off-chain data sources. As a non-limiting example, the off-chain data sources include, but are not limited to, system hardware of the endorsing node 420 such as a clock 421, another distributed ledger (blockchain) such as ledger B 422, an external data source 423 such as a database, a file, an application, and the like, and a user interface 424 which can receive inputs from a user via an input device.

For example, upon receiving the transaction request from the client node 410, the endorsing node 420 may simulate the transaction just to collect a read set (a list of assets read by the transaction) and a write set (a list of assets modified or added by the transaction). In addition, the collected read and write sets may be passed to a customized endorsement smart contract of the endorsing node 420 which implements user-supplied custom endorsement logic. For example, the custom endorsement logic can connect to an external database 423 or analytical platform to do fraud detection, notify a human to endorse or reject the transaction via the user interface 424, look at read and write sets to perform access control, and the like. The access control may determine if the client has or does not have permission to access or modify the asset, and the transaction can be rejected without endorsing it. Upon success or failure of endorsement, the client node 410 may be notified by the endorsing node 420 with an adequate reason if the transaction was rejected, such as the client does not have access to the asset, the timing of the transaction is not allowed, or the like.

In some embodiments, the endorsement logic at one or more endorsing nodes can be different from others. As a result, each organization in the blockchain network that has control over an endorsing node can implement their own endorsement logic. To install the specialized endorsement logic, in one embodiment, during node startup, the code for endorsement logic could be passed as an argument so that the node can insert the logic into an endorsement system smartcontract. That is, the code can be added dynamically to the smart contract of the endorsement node for modifying or otherwise customizing the endorsement logic at the endorsing node. In another embodiment, the customized endorsement logic can be deployed on the specified node during the chaincode deployment. As another example, the endorsement logic can be updated during its lifecycle using a special system transaction called configuration transaction. This transaction can be processed by a system smart contract on the node locally to update the endorsement logic.

In a conventional endorsement process there are not rejects of an endorsement. For example, when a client sends the transaction to nodes in a blockchain network, it always endorses the transaction. Once the client gets enough endorsement (signatures of nodes in blockchain network), the transaction can be submitted to network for validation and commit. In contrast, in the example embodiments, a node can either accept or reject based on one or more parameters, for example, custom endorsement logic at the node (as it could be different on each nodes, read set of the transaction, write set of the transaction, identity of the client which submitted the transaction, and the like.

As per the endorsement policy defined during the deployment, it is the client node's task to collect enough endorsements for a transaction. When it cannot receive enough endorsements, it can either retry for a few times or adjust the transaction based on reason provided in the reject of endorsement. If the client submits a transaction without enough endorsements, it will be rejected later.

In the specialized endorsement logic, a peer can additionally record a vote along with its endorsement. According to various embodiments, the vote can be a value captured as result of the custom endorsement logic which the peer executed. The vote will be interpreted and processed by appropriate subsystems. For example, a vote could be a bag of bytes (e.g., an opaque value. For instance, an endorsing node can vote on the priority a transaction should receive in the network. The 'vote' from this peer would be considered in conjunction with 'votes' from other peers to come up with the final priority assigned to this transaction. How the votes are collated can be based on an accepted policy, like average, max, min, etc.

Figure 5A:
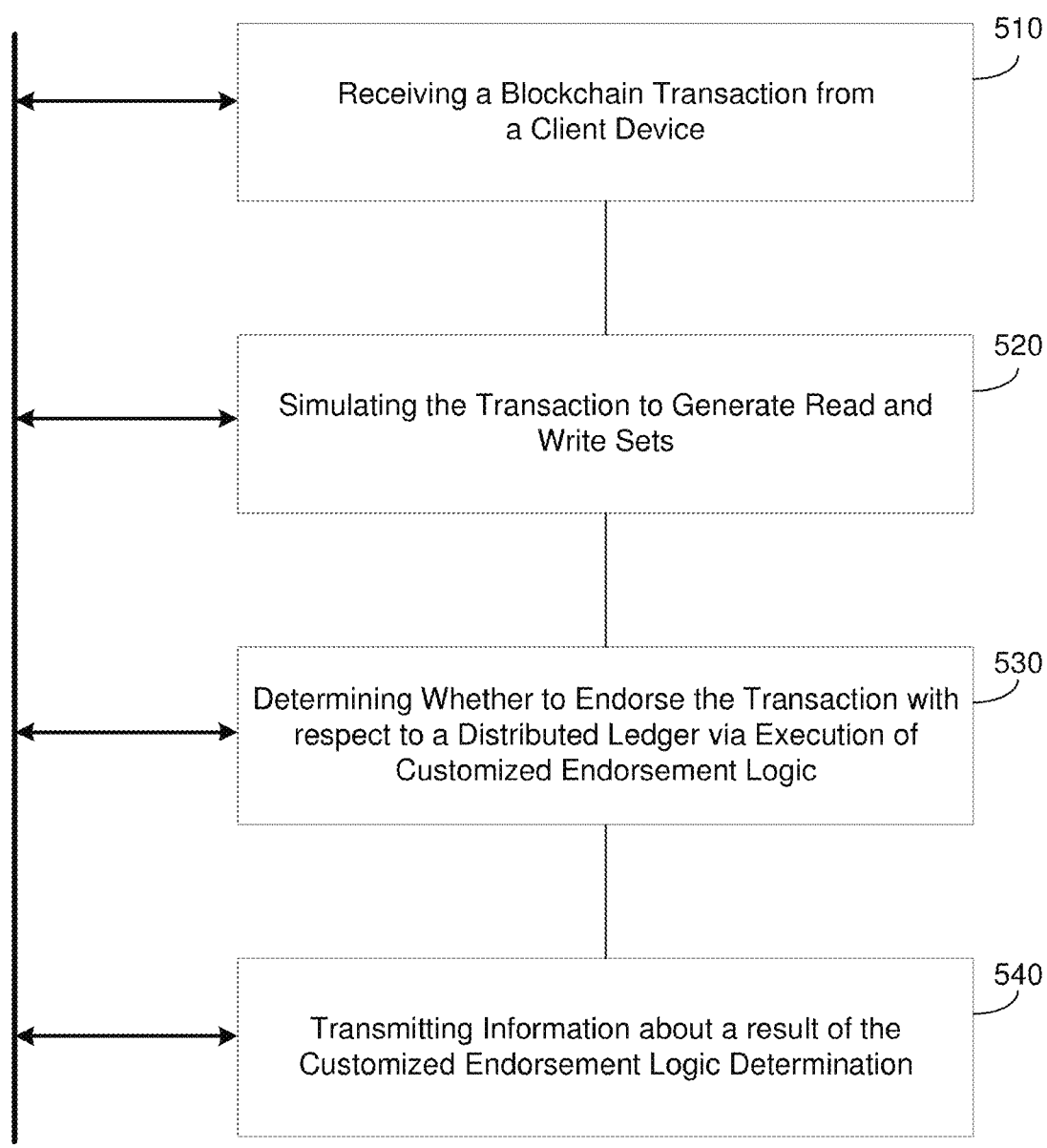

FIG. 5A illustrates a method 500A of processing a transaction based on a customized endorsement according to example embodiments. For example, the method 500A may be performed by an endorsing node (e.g., node 420 in FIG. 4, etc.) The node may include a computing system such as a server, a database, a computer, a device, a cloud platform, and the like. Referring to FIG. 5, in 510, the method includes receiving, via a network, a blockchain request from a client device. For example, the request may include a transaction and a request to store the transaction to a distributed ledger that is replicated across the nodes in a blockchain network. The request may also include an indicator that requests the endorsing node to endorse the transaction.

In 520, the method includes simulating the transaction to generate a read set of data being read by the transaction and a write set of data being written by the transaction. In 530, the method further includes determining whether to endorse the transaction with respect to a distributed ledger by executing customizable endorsement logic of the blockchain node. For example, the executing customizable endorsement logic receives, as input, the generated read and write sets and determines whether or not the transaction should be committed to a data block of the distributed ledger based on the generated read and write sets. In 540, the method includes transmitting information about a result of the customized endorsement logic determination to the client device. In some embodiments, the customizable endorsement logic of the blockchain node performs a different endorsement determination than a customizable endorsement logic of another blockchain node that endorses the transaction.

FIGS. 5B and 5C illustrate additional examples of methods 500B and 500C for processing blockchain transactions based on customized endorsement logic. In FIG. 5B, the customizable endorsement logic determines whether or not to commit the blockchain request to the distributed ledger based on data retrieved off-chain, in 531, for example, data from an external data source, a user input received from a user interface, information identified from another blockchain, information extracted from a system clock of the blockchain node, and the like. In response to determining to reject the transaction from being committed to the distributed ledger, the endorsement logic may further determine a reason for rejecting the transaction, in 532, and transmit the determined reason to the client device, in 533. As another example, in FIG. 5C, in response to determining to commit the transaction to the distributed ledger in 535, the customized endorsement logic may determine a priority level of the transaction for being committed to the distributed ledger, in 536, and transmit the determined priority level to the client device, in 537.

Figure 6A:
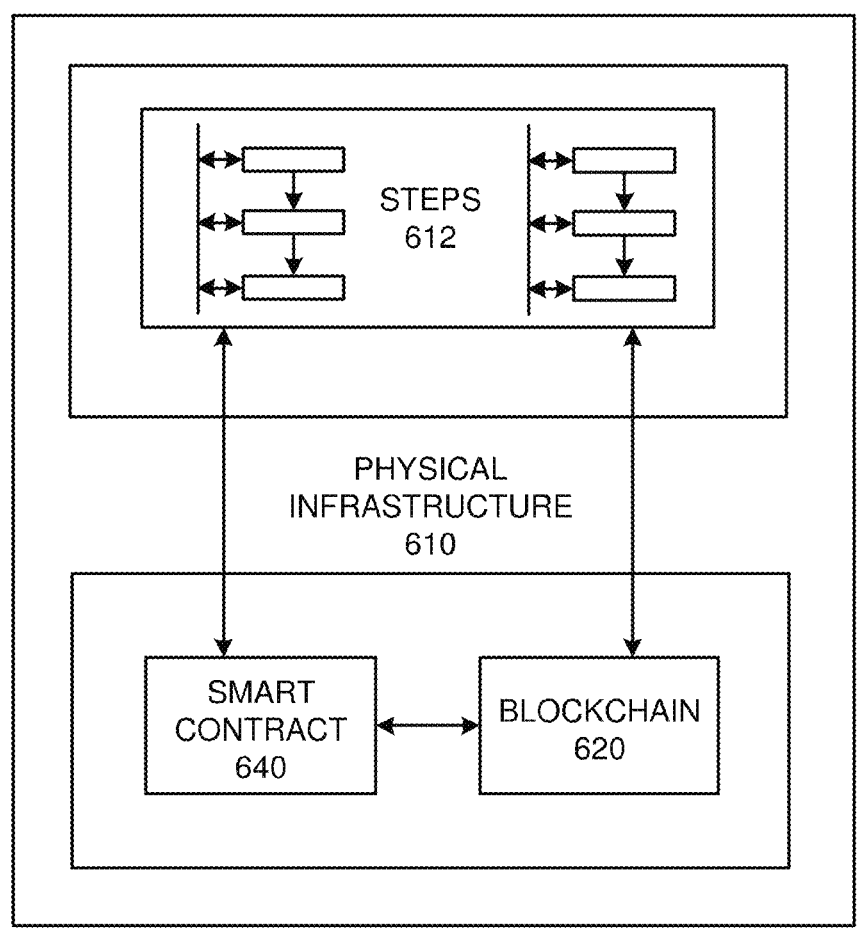
FIG. 6A is a diagram illustrating a physical infrastructure configured to perform various operations on the blockchain in accordance with one or more operations described herein, according to example embodiments.

FIG. 6A illustrates a physical infrastructure configured to perform various operations on the blockchain in accordance with one or more of the methods of operation according to example embodiments. Referring to FIG. 6A, configuration 600A includes a physical infrastructure 610 with a blockchain 620 and a smart contract 640, which may execute any of the operational steps 612 included in any of the example embodiments. The steps/operations 612 may include one or more customized endorsement logic. The steps may represent output or written information that is written or read from one or more smart contracts 640 and/or blockchains 620 that reside on the physical infrastructure 610 of a computer system configuration. The data can be output from an executed smart contract 640 such as a customized endorsement logic and/or blockchain 620. The physical infrastructure 610 may include one or more computers, servers, processors, memories, and/or wireless communication devices.

Figure 6B:
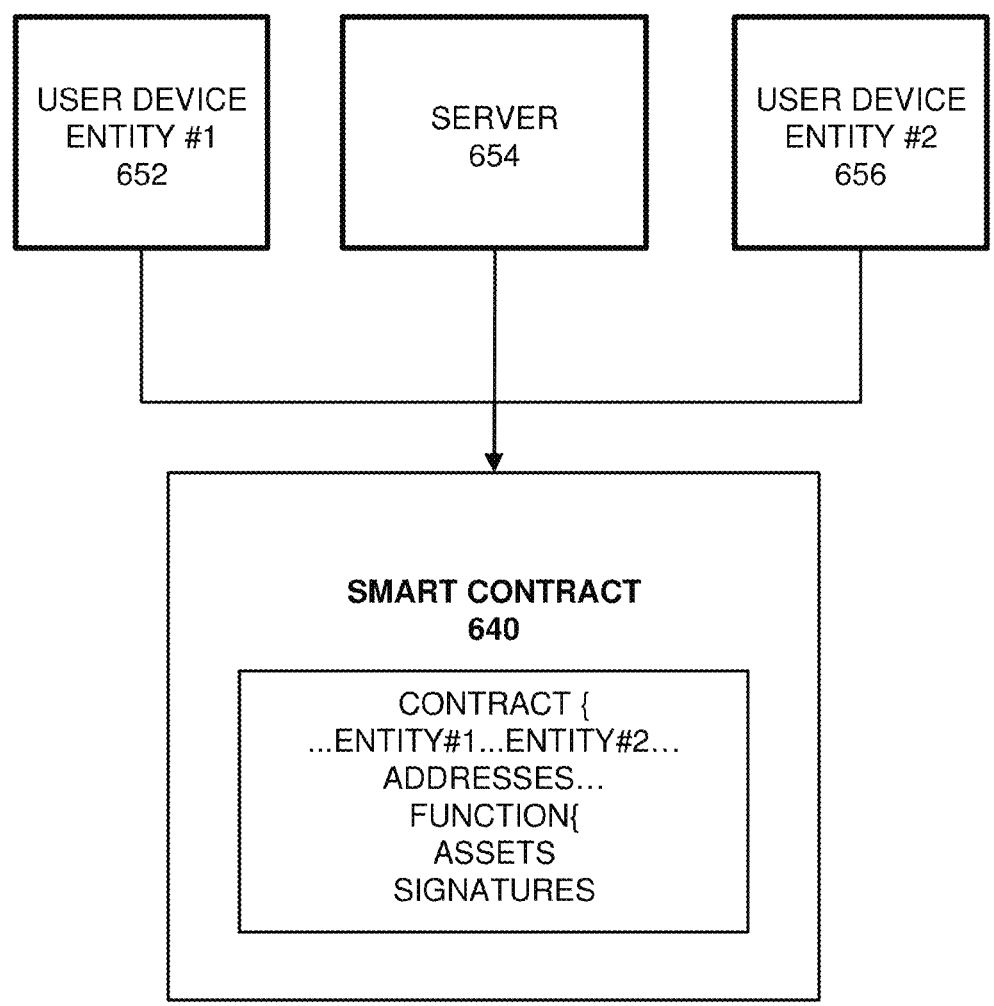
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, configuration 600B may represent a communication session, an asset transfer session or a process or procedure that is driven by a smart contract 640 which explicitly identifies one or more user devices 652 and/or 656. The execution, operations and results of the smart contract execution may be managed by a server 654. For example, the server 654 may execute software program that includes customized endorsement logic as described herein. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
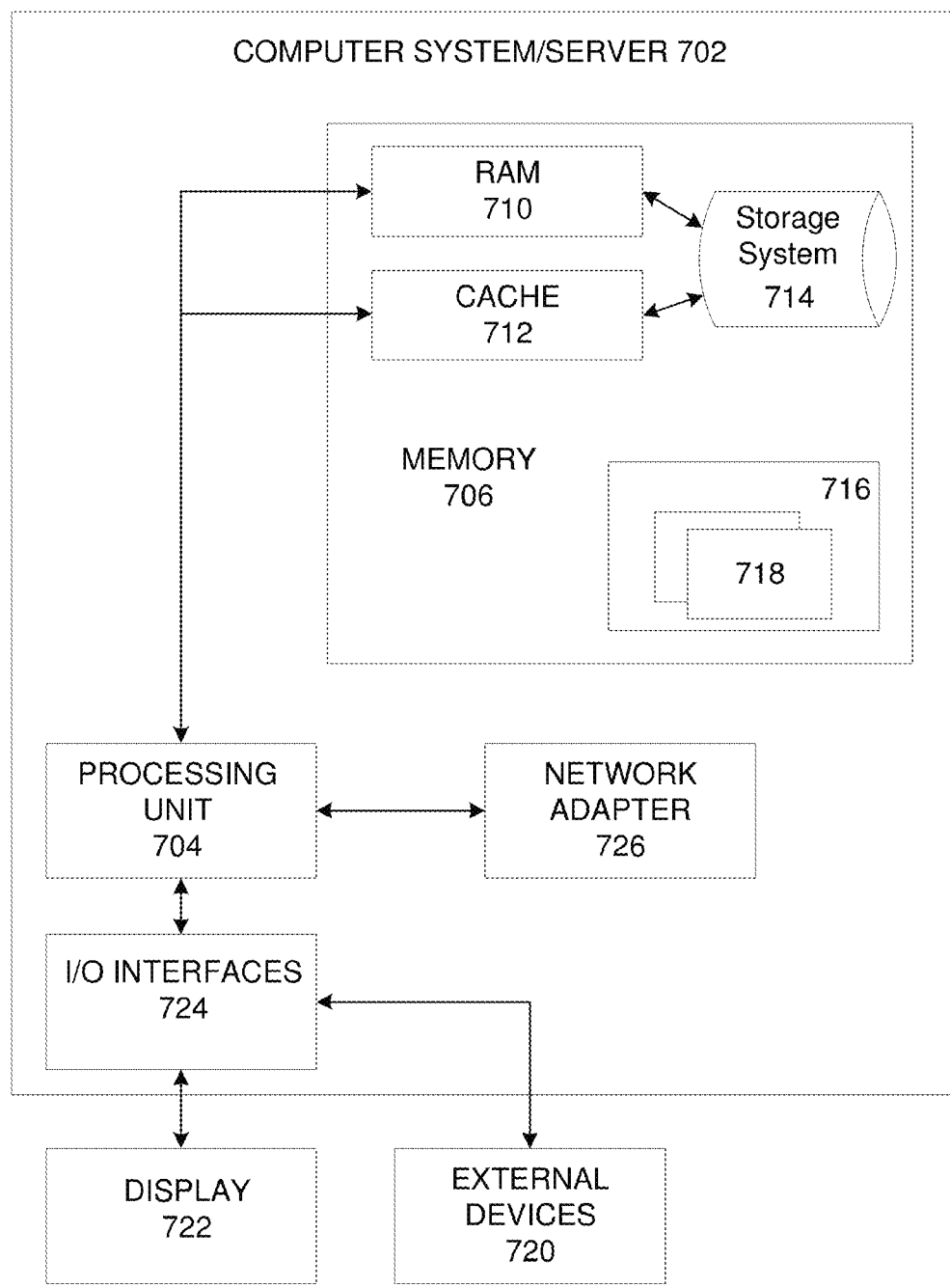
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove. For example, the computing node 700 may be an organizing node, a requesting node, a network node, a combination of nodes (e.g., organizer node and network node), and the like.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 (e.g., network interface, etc.) communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the network interface 726 may receive a blockchain request from a client device. For example, the blockchain request may include a transaction requested by the client device received directly from the client device, received via one or more intermediate blockchain nodes, and the like. The processor 704 may simulate the transaction to generate a read set of data being read by the transaction and a write set of data being written by the transaction. According to various embodiments, the processor 704 may determine whether to endorse the transaction with respect to a distributed ledger via execution of customizable endorsement logic that is specific to the blockchain node. The customize endorsement logic may be user-added to the node and may consider various data sources outside of the blockchain. When executed by the processor, the customizable endorsement logic receives, as input, the generated read and write sets and determines whether or not the transaction should be committed to a data block of the distributed ledger based on the generated read and write sets. In addition, the processor 704 may control the network interface 726 to transmit information about a result of the customized endorsement logic determination to the client device directly or via one or more intermediate nodes.

In some embodiments, the processor 704 may perform a different endorsement determination via the customized endorsement logic than a customizable endorsement logic of another blockchain node that also endorses the same transaction. The customizable endorsement logic may trigger the processor 704 to determine whether or not to commit the transaction to the distributed ledger based on data retrieved off-chain such as data from one or more of an external data source (e.g., database, ledger, file, etc.), a user input received from a user interface, an application (e.g., analytic, etc.), information identified from another blockchain, information extracted from system hardware of the blockchain node such as a system clock of the blockchain node, and the like.

In some embodiments, in response to determining to reject the transaction from being committed to the distributed ledger, the processor 704 executing the customized endorsement logic may determine a reason for rejecting the transaction, and the processor 704 may control the network interface 726 to transmit the reason to the client device. As another example, in response to determining to commit the transaction to the distributed ledger, the processor 704 executing the customized endorsement logic may determine a priority level of the transaction for being committed to the distributed ledger, and the processor 704 may further control the network interface 726 to transmit the priority level of the transaction to the client device.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A blockchain node, comprising:
   a network interface configured to receive a blockchain transaction from a client; and
   a processor configured to
      simulate the blockchain transaction against a current state of a blockchain ledger to generate a read set of data read by the blockchain transaction from the blockchain ledger and a write set of data written by the blockchain transaction to the blockchain ledger, and
      determine not to endorse the blockchain transaction with respect to the blockchain ledger via execution of customizable endorsement logic of the blockchain node, wherein the executing customizable endorsement logic receives, as input, the generated read and write sets and determines that the client does not have permission to perform the blockchain transaction based on the generated read and write sets, and the processor is further configured to control the network interface to transmit information about a result of the customized endorsement logic determination to the client.

2. The blockchain node of claim 1, wherein the execution of the customizable endorsement logic of the blockchain node performs a different endorsement determination than an executing customizable endorsement logic of another blockchain node that also endorses the blockchain transaction.

3. The blockchain node of claim 1, wherein the execution of the customizable endorsement logic determines whether or not to commit the blockchain transaction to the blockchain ledger based on data retrieved off-chain from an external data source.

4. The blockchain node of claim 1, wherein the execution of the customizable endorsement logic determines whether or not to commit the blockchain transaction to the blockchain ledger based on a user input received from a user interface.

5. The blockchain node of claim 1, wherein the execution of the customizable endorsement logic determines whether or not to commit the blockchain transaction to the blockchain ledger based on information identified from another blockchain.

6. The blockchain node of claim 1, wherein the execution of the customizable endorsement logic determines whether or not to commit the blockchain transaction to the blockchain ledger based on information extracted from a system clock of the blockchain node.

7. The blockchain node of claim 1, wherein, in response to determining to reject the blockchain transaction from being committed to the blockchain ledger, the execution of the customized endorsement logic further determines a reason for rejecting the blockchain transaction, and the processor further controls the network interface to transmit the reason to the client.

8. The blockchain node of claim 1, wherein, in response to determining to commit the blockchain transaction to the blockchain ledger, the execution of the customized endorsement logic further determines a priority level of the blockchain transaction for being committed to the blockchain ledger, and the processor further controls the network interface to transmit the priority level of the transaction to the client.

9. A method of a blockchain node, comprising:
   receiving, via a network, a blockchain transaction from a client;
   simulating the blockchain transaction against a current state of a blockchain ledger to generate a read set of data read by the blockchain transaction from the blockchain ledger and a write set of data written by the blockchain transaction to the blockchain ledger;
   determining not to endorse the blockchain transaction with respect to the blockchain ledger by executing customizable endorsement logic of the blockchain node, wherein the executing customizable endorsement logic receives, as input, the generated read and write sets and determines that the client does not have permission to perform the blockchain transaction based on the generated read and write sets; and
   transmitting information about a result of the customized endorsement logic determination to the client.

10. The method of claim 9, wherein the executing customizable endorsement logic of the blockchain node performs a different endorsement determination than a customizable endorsement logic of another blockchain node that endorses the blockchain transaction.

11. The method of claim 9, wherein the determining by the customizable endorsement logic comprises determining whether or not to commit the blockchain transaction to the blockchain ledger based on data retrieved off-chain from an external data source.

12. The method of claim 9, wherein the determining by the customizable endorsement logic comprises determining whether or not to commit the blockchain transaction to the blockchain ledger based on a user input received from a user interface.

13. The method of claim 9, wherein the determining by the customizable endorsement logic comprises determining whether or not to commit the blockchain transaction to the blockchain ledger based on information identified from another blockchain.

14. The method of claim 9, wherein the determining by the customizable endorsement logic comprises determining whether or not to commit the blockchain transaction to the blockchain ledger based on information extracted from a system clock of the blockchain node.

15. The method of claim 9, wherein, in response to determining to reject the blockchain transaction from being committed to the blockchain ledger, the determining by the endorsement logic further comprises determining a reason for rejecting the blockchain transaction and the transmitting further comprises transmitting the determined reason to the client.

16. The method of claim 9, wherein, in response to determining to commit the blockchain transaction to the blockchain ledger, the determining by the endorsement logic further comprises determining a priority level of the blockchain transaction for being committed to the blockchain ledger, and the transmitting further comprises transmitting the determined priority level to the client.

17. A non-transitory computer readable storage medium storing program instructions that, when executed, cause a processor to perform a method comprising:
　receiving, via a network, a blockchain transaction from a client;
　simulating the blockchain transaction against a current state of a blockchain ledger to generate a read set of data read by the blockchain transaction from the blockchain ledger and a write set of data written by the blockchain transaction to the blockchain ledger;
　determining not to endorse the blockchain transaction with respect to the blockchain ledger by executing customizable endorsement logic of the blockchain node, wherein the executing customizable endorsement logic receives, as input, the generated read and write sets and determines that the client does not have permission to perform the blockchain transaction based on the generated read and write sets; and
　transmitting information about a result of the customized endorsement logic determination to the client.

18. The non-transitory computer readable storage medium of claim 17, wherein the customizable endorsement logic of the blockchain node performs a different endorsement determination than a customizable endorsement logic of another blockchain node that endorses the blockchain transaction.

19. The non-transitory computer readable storage medium of claim 17, wherein the determining by the customizable endorsement logic comprises determining whether or not to commit the blockchain transaction to the blockchain ledger based on data retrieved off-chain from an external data source.

20. The non-transitory computer readable storage medium of claim 17, wherein the determining by the customizable endorsement logic comprises determining whether or not to commit the blockchain transaction to the blockchain ledger based on a user input received from a user interface.

* * * * *